United States Patent
Gopalan et al.

(10) Patent No.: US 7,035,700 B2
(45) Date of Patent: Apr. 25, 2006

(54) METHOD AND APPARATUS FOR EMBEDDING DATA IN AUDIO SIGNALS

(75) Inventors: Kaliappan Gopalan, Munster, IN (US); Daniel S. Benincasa, Holland Patent, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 789 days.

(21) Appl. No.: 10/098,765

(22) Filed: Mar. 13, 2002

(65) Prior Publication Data

US 2003/0176934 A1 Sep. 18, 2003

(51) Int. Cl.
- *G06F 17/00* (2006.01)
- *G06F 11/30* (2006.01)
- *G10L 19/00* (2006.01)
- *H04N 7/167* (2006.01)

(52) U.S. Cl. .................... 700/94; 704/200.1; 704/273; 380/236; 713/193

(58) Field of Classification Search ................ 700/94; 713/193; 704/273, 200.1; 882/100; 380/236
See application file for complete search history.

(56) References Cited

OTHER PUBLICATIONS

Gopalan, K.G. et. al. Data Embedding In Audio Signals. Aerospace Conference, 2001, IEEE Proceedings. vol. 6, Publication Date Mar. 10-17, 2001, pp. 2713-2720.*

Garcia, Richard A. digital Watermarking of Audio Signals Using a Psychoacoustic Auditory Model and Spread Spectrum Theory. University of Miami, Apr. 21, 1999.*

Tilki, John F. et al. Encoding a Hidden Auxiliary Channel Onto a Digital Audio Signal Using Psychoacoustic Masking. 1997.*

Cvejic, Nedelijko et al. Audio Watermarking Using m-Sequences and Temporal Masking. Applications of Signal Processing to Audio and Acoustics. Oct. 2001, pp. 227-230.*

(Continued)

*Primary Examiner*—Vivian Chin
*Assistant Examiner*—Devona E Faulk
(74) *Attorney, Agent, or Firm*—Joseph A. Mancini

(57) ABSTRACT

Method and apparatus for embedding binary data in audio signals. The magnitude of the power spectrum at the perceptual holes of each frame of a host speech utterance, may be altered so as to embed digital data. The phase spectrum at perceptually masked spectral points of each frame of a host speech utterance, may also be altered so as to embed digital data.

5 Claims, 3 Drawing Sheets

OTHER PUBLICATIONS

Bassia, Paraskevi et al. Robust Audio Watermarkingi in the Time Domain. IEEE Transactions on Multimedia. vol. 3, No. 2, Jun. 2001.*

Swanson, Michelle D. et al. Multimedia Data-Embedding and Watermarking Technologies. Proceedings of the IEEE, vol. 86, No. 6, Jun. 1998, pp. 1064-1087.*

Anderson, Ross L. et al. On the Limits of Stenography. IEEE Journal on Selected Areas in Communication. vol. 16, No. 4, May 1998. vol. 16, No. 4, pp. 474-481.*

Boney, Lawrence et al. Digital Watermarks for Audio Signals. Multimedia Computing Systems, 1996, Prcoeedings of the 3rd IEEE International Conference on Multimedia. pp. 473-480.*

* cited by examiner

METHOD AND APPARATUS FOR EMBEDDING DATA IN AUDIO SIGNALS

STATEMENT OF GOVERNMENT INTEREST

The invention described herein may be manufactured and used by or for the Government of the United States for governmental purposes without the payment of any royalty thereon.

BACKGROUND OF THE INVENTION

Data embedding is a form of steganography that is concerned with ways of inserting a given secret message or data in an innocuous cover message, such as an image, video, audio, or computer code. Digital data embedding in audio signals has many applications. These applications include covert communication by securely hiding encoded/encrypted information in audio signals, copyright protection of transmitted audio signals, and embedding information for describing, modifying, and tracking of audio signals. By providing different access levels to the embedded data, the quality of the audio signal and the ability to hear the hidden message can be controlled. Transmission of battlefield information via an auxiliary or cover audio signal could play an essential role in the security and safety of personnel and resources.

Most of the work in data hiding has been concentrated on hiding a small amount of information such as copyright data or a watermark in images and video segments. However, general requirements, challenges and principles of hiding data in an audio are the same as those for embedding information in video. Robustness of the hidden data, for example, is a key requirement for successful embedding and retrieval of the data. In other words, standard signal processing operations, such as noise removal and signal enhancement, must not result in loss or degradation of the embedded information. Additionally, for covert communication, the embedded information must withstand channel noise and intentional attacks or jamming on the signal. Also important in covert communication is the resilience of the hidden information to stay hidden to pirates during their intentional or unintentional attempts at detection. A measure of effectiveness of data embedding is the probability of detection of hidden data. Clearly the more robust the host medium—image, video, or audio—to attacks and common operations, the higher would be its effectiveness.

Additional requirements specific for embedding data in audio signals vary with the applications. In general, the embedded data must be perceptually undetectable or inaudible. While this may not be strictly required or even needed for watermarking of audio for browsers on the Internet, covert communication calls for the hidden message to be truly imperceptible. Tamper resistance of the hidden message, on the other hand, is more crucial in battlefield covert communication than in protecting ownership of the cover audio. Additionally, extraction of the hidden message must not require access to the host (cover) audio. Clearly, lack of the original host signal that was used to embed the message makes it difficult to extract and adjudge the quality and quantity of the hidden data. For covert communication, however, this challenge must be met even at the cost of degraded quality of the message-embedded audio. Other requirements, such as robustness to transmission channel noise, and linear and nonlinear filtering, are also important in hiding data in audio. Security requirements in covert communication dictate that an unauthorized user must not be able to detect the presence of hidden data unless he has the key to the insertion of data. This may require encryption of the data prior to its insertion in the host audio.

Some of the most common techniques for hiding data in images employ the properties of human visual system. The least significant bits of an image may be altered in accordance with the data to be embedded, for example. The technique in this case relies on the low sensitivity of the human visual system to contrast. Variations of this technique include embedding pseudo random noise sequence that appears as quantization noise, and modifying the Discrete Cosine Transform (DCT) or wavelet transform coefficients, etc. for watermarking. Other methods also exploit imperceptible brightness levels to add tags, identification strings, etc. More recently, spread spectrum techniques, in which the watermark to be embedded in an image is spread throughout the spectrum of the image, have been widely considered. For video, blue color has been used to embed watermark based on the least sensitivity of human visual system to modifications in the blue band.

The notion of creating an imperceptible data-embedded image based on the human visual system threshold has been extended by several researchers to embed data in host audio. In general, the procedure exploits the frequency and temporal masking properties of the human auditory system (HAS) to modify the cover audio in such a way that changes due to the embedded data are inaudible. Other methods to watermark a host audio use replacement of spectral components in the high, middle, or other pre-selected frequency bands in accordance with the sequence to be embedded. In addition, several techniques involving the use of spread spectrum noise sequence have been reported. By far the methods employing the psychoacoustical masking properties of HAS in some form appear to better meet the challenges and requirements of audio data embedding.

OBJECTS AND SUMMARY OF THE INVENTION

The present invention provides a method and apparatus for insuring secure communications by embedding digital data in audio signals.

One object of the present invention is to provide a method and apparatus for embedding digital data within the power amplitude spectrum of a host signal.

Another object of the present invention is to provide a method and apparatus for embedding digital data within the phase spectrum of a host signal.

Briefly stated, the present invention provides a method and apparatus for embedding binary data in audio signals. The magnitude of the power spectrum at the perceptual holes of each frame of a host speech utterance, may be altered so as to embed digital data. The phase spectrum at perceptually masked spectral points of each frame of a host speech utterance, may also be altered so as to embed digital data.

According to a feature of the invention, method for embedding data in audio signals by altering the amplitude of a host signal audio power spectrum, comprises the steps of inputting a host signal; calculating the discrete fourier transform points for the masking threshold level; computing the masker frequencies and their power levels on a frame-to-frame basis; determining a global threshold of hearing at each said masker frequency on a frame-to-frame basis; obtaining the sound pressure level for quiet, below which a signal is inaudible; inputting a covert signal; digitizing said covert signal; modifying the amplitude of said power spectrum of said host signal by embedding therein said digitized said covert signal on a frame-by-frame basis; inverting the frequency spectrum of said amplitude-modified said power spectrum; obtaining time domain samples for said inverted frequency spectrum; quantizing said time domain samples; transmitting said time domain samples; receiving at a receiver each quantized bit of each said frame of said time domain-sampled said inverted frequency spectrum; processing said each quantized bit to obtain said masking threshold; and recovering data from said embedded said covert signal.

According to another feature of the invention, method for embedding data in audio signals by altering the phase spectrum of a host signal, comprises the steps of inputting a host signal; calculating the perceptually masked discrete fourier transform points; inputting a covert signal; digitizing said covert signal; modifying the phase of said phase spectrum by embedding therein said digitized said covert signal on a frame-by-frame basis; inverting said phase-modified said phase spectrum; obtaining time domain samples for said inverted said phase-modified spectrum; quantizing said time domain samples; transmitting said time domain samples; receiving at a receiver each quantized bit of each said frame of said time domain-sampled said inverted phase spectrum; processing said each quantized bit to obtain said masking threshold and to recover said phase; and recovering data from said embedded said covert signal.

These and may other objects, features and advantages of the present invention will be readily apparent to one skilled in the pertinent art from the following detailed description of a preferred embodiment of the invention and the related figures, in which like reference numerals designate the same elements.

DETAILED DESCRIPTION OF THE PREFERRED EMBODIMENT

The present invention provides a method and apparatus for embedding binary data in audio signals using two different techniques. The first technique (see FIG. 1) alters the magnitude of the power spectrum at the perceptual holes of each frame of a host speech utterance, while the second technique alters the phase spectrum at perceptually masked spectral points (see FIG. 2).

Both of the techniques provided in this invention for embedding binary data in audio signals are based on auditory masking. Auditory masking is a perceptual property of the human auditory system in which the presence of a strong tone renders the hearing of a weaker tone in its temporal or spectral neighborhood imperceptible. Also, a pure tone is masked by a wide-band noise if the tone occurs within a critical band. Frequency masking is based on the observation that the human ear cannot perceive frequencies at lower energies when these frequencies are present in the vicinity of tone- or noise-like frequencies at higher energies. Temporal masking occurs in which a low-level tone becomes undetected when it appears immediately before or after a strong tone. Many psycho-acoustic experiments have been reported to verify the spectral and temporal masking phenomena. The design of high quality audio coders, such as Moving Picture Experts Group (MPEG) coders, is based on the property of the psychoacoustical model. As with the design of coders, the masking phenomenon can be used to embed data in an audio with negligible perceptual difference between the original, unembedded audio and the data-embedded audio.

Both techniques for embedding binary data were developed on the principle of psychoacoustical masking. The first technique alters the magnitude of the power spectrum at the perceptual holes of each frame of a host speech utterance (see FIG. 1). The second technique is based on the observation that, in general, the phase spectrum can be altered at perceptually masked spectral points (see FIG. 2). While this change in amplitude and phase modifies the waveform, perceptual quality of speech is not affected.

Figure 1:
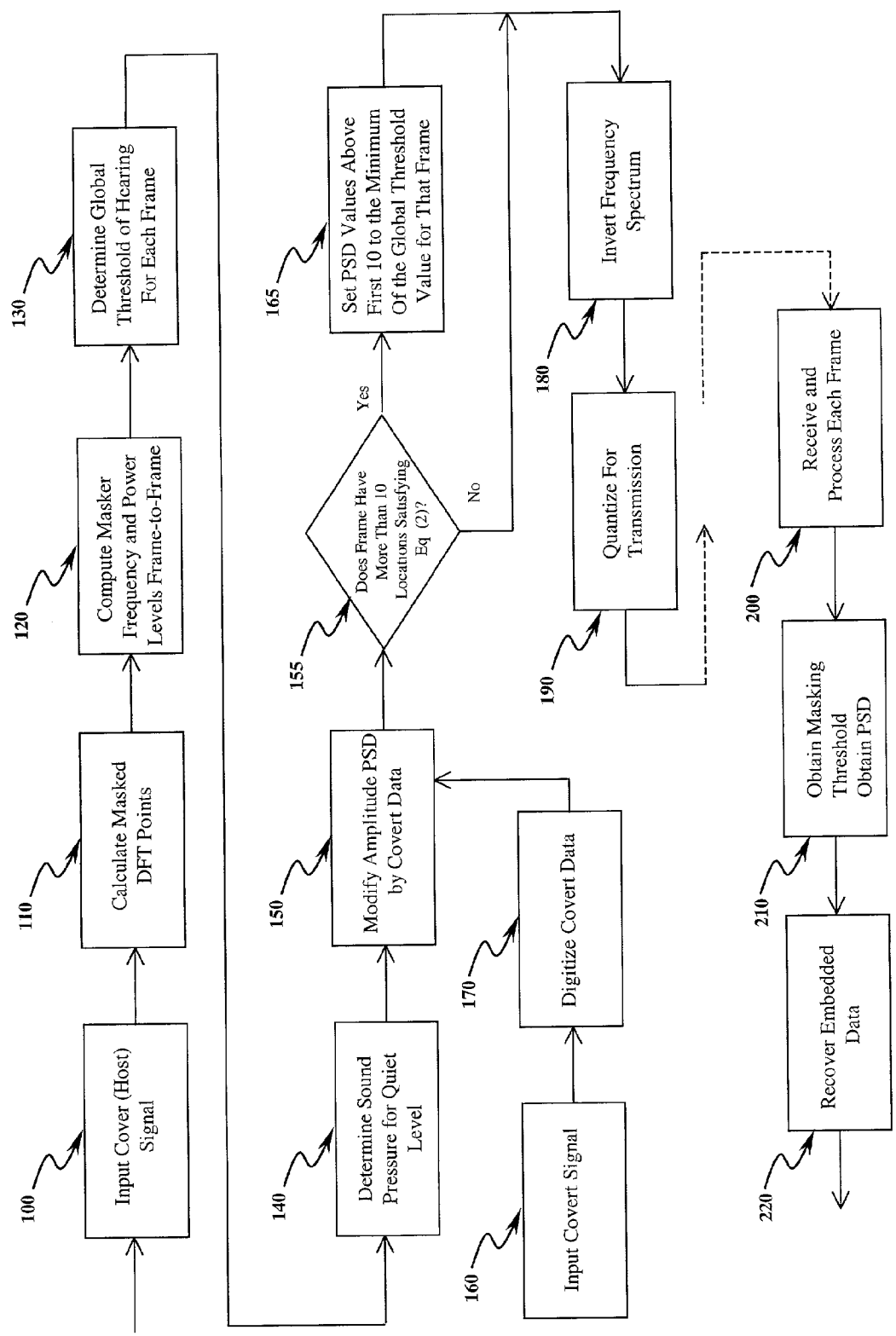
FIG. 1 is a block diagram of the procedure for embedding data into perceptually masked locations of the amplitude of the power spectral density of the cover (host) signal.

Referring to FIG. 1, the technique of modulation of PSD by binary data is different from prior art techniques. The PSD of the frequency-masked points is set to one of two values—low or high—depending on the bit to be embedded. The new PSD values are chosen such that they both are below the threshold of hearing but above quiet threshold, with margin for variation due to additive transmission noise. Since the data-modulated PSD is still below the hearing threshold, no difference in the perceptual quality of the embedded speech can be detected from that of the unaltered host speech. Choosing only a finite number of predetermined perceptual holes (frequencies) for embedding, presence of data in the embedded audio is concealed from unauthorized users. Additionally, an infinite number of possibilities exist for the choice of the low and high PSD values to be used for modification in accordance with data. The stego key, therefore, is formed by the location (frequency indices) and the actual PSD values used for bits 0 and 1. Using perceptually masked frequencies that are within a given range or a set of discontinuous frequencies can strengthen the key further. Lack of the stego key thus prevents unauthorized tampering of data from the embedded stego signal. Margins between data-modulated PSD values and the thresholds of quiet and hearing enable data retrieval in the presence of noise.

Figure 2:
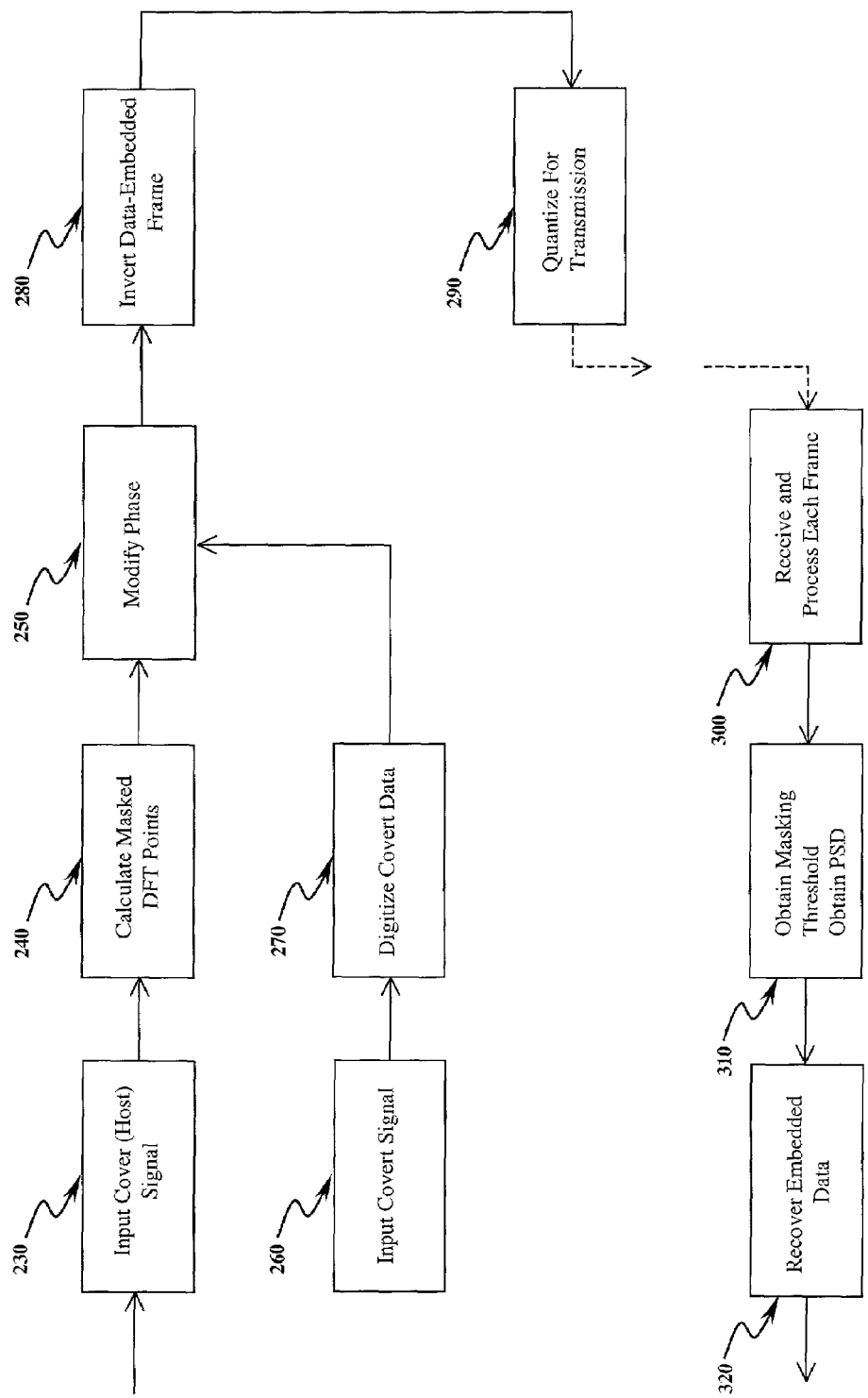
FIG. 2 is a block diagram of the procedure for embedding data into perceptually masked locations of the phase of the cover (host) signal.

Referring to FIG. 2, the technique of phase variation alters the absolute phase at masked spectral points, compared to prior art methods that alter the phase at every fourth point within a given band, relative to a reference phase point. The present invention's technique ensures that changes in time samples are rendered inaudible. Also, with absolute phase change of ±φ, no synchronization is needed at the receiver. For both techniques, the procedure begins with the calculation of the power spectral density and the global masking threshold using tone and noise maskers present in each frame of speech.

From the experiments conducted on a limited number of utterances, it is clear that insertion of data by phase modification has the potential for successful retrieval of data of limited size (see FIG. 1). Modification of the PSD may be more robust in the presence of additive noise, because of the relative, rather than the absolute values used to detect bits (see FIG. 2). In both cases, data integrity can be increased by embedding data only in those frames that have no transition between voiced and unvoiced frames or low energy. Well-established procedures to detect voiced/unvoiced boundaries can be used to reduce the additional processing involved. Assurance of embedded information may be achieved using error detection techniques, such as inserting parity bits or a known string of bits, before and after data bits in each frame. Data size, as seen in the three utterances, can be 10 or more bits/frame, some of which may include parity and/or error correction bits. If all the frames can embed data—as with voiced and unvoiced frames without voiced/unvoiced (V/UV) boundaries in any frame—a maximum of 620 bits can be inserted in one second of audio. This is a much higher rate than what has been reported.

With successful embedding and retrieval using PSD (see FIG. 1) and phase (see FIG. 2), the present invention's two techniques can be combined to increase the volume of data embedded. This is possible because of the same set of perceptual frequency nulls used in each case. Perceptual speech quality of the resulting stego signal can then be quantified using objective quality measures.

Additionally, using the midband of frequencies in the range of 1 kHz to 3 kHz, phase may be modified by a small value at all locations irrespective of the perceptual holes. This is possible because of the imperceptible nature of the phase variation in the mid frequency range. Relative, rather than absolute phase must be used.

For embedding a large volume of data, as from another audio signal, a compact parametric or transform domain model of the covert message may be used. With 54 bits per frame from an Linear Predictive Code (LPC)-10 model, for instance, several frames of a cover signal may be needed to insert one frame of covert speech. Depending on the expected quality of the retrieved covert message audio, other compact representations, such as DCT and Fourier-Bessel coefficients, may be used for embedding.

Voiced speech arising from the resonance of the vocal tract typically has a larger number of masked points. Therefore, a known cover signal containing primarily voiced speech can be used for inserting a large number of message bits. Fixed and known DFT points carrying the hidden message enables fast retrieval of the message without resorting to threshold calculations for every received stego frame. Use of such a fixed cover signal may not be effective for covert communication of different battlefield messages; many civilian applications, however, can benefit from employing a known utterance for conveying different information.

Embedding of data by modifying the power spectral density and the phase of speech frames at perceptually masked frequency points is reported. Based on a limited number of tests, phase embedding appears to result in better data retrieval. Informal listening tests have shown that the perceptual quality of the data-inserted utterances remained the same as the original cover audio. Higher rate of data recovery may be possible by choosing only the voiced or unvoiced frames and excluding frames with V/UV boundaries or the frames with low energy. More data may be inserted by combining the two methods without altering the perceptual quality of the cover audio.

Frame PSD Modification

Referring to FIG. 1, a cover or "host" signal is input 100. To exploit the masking property for data embedding, the perceptually masking threshold level discrete fourier transform (DFT) points are calculated 110. For an utterance of speech the masker frequencies—tonal and noise-like—and their power levels are computed from frame to frame 120. A global threshold of hearing based on the maskers is determined for each frame 130. Also, the sound pressure level for quiet, below which a signal is inaudible, is obtained 140.

Figure 3:
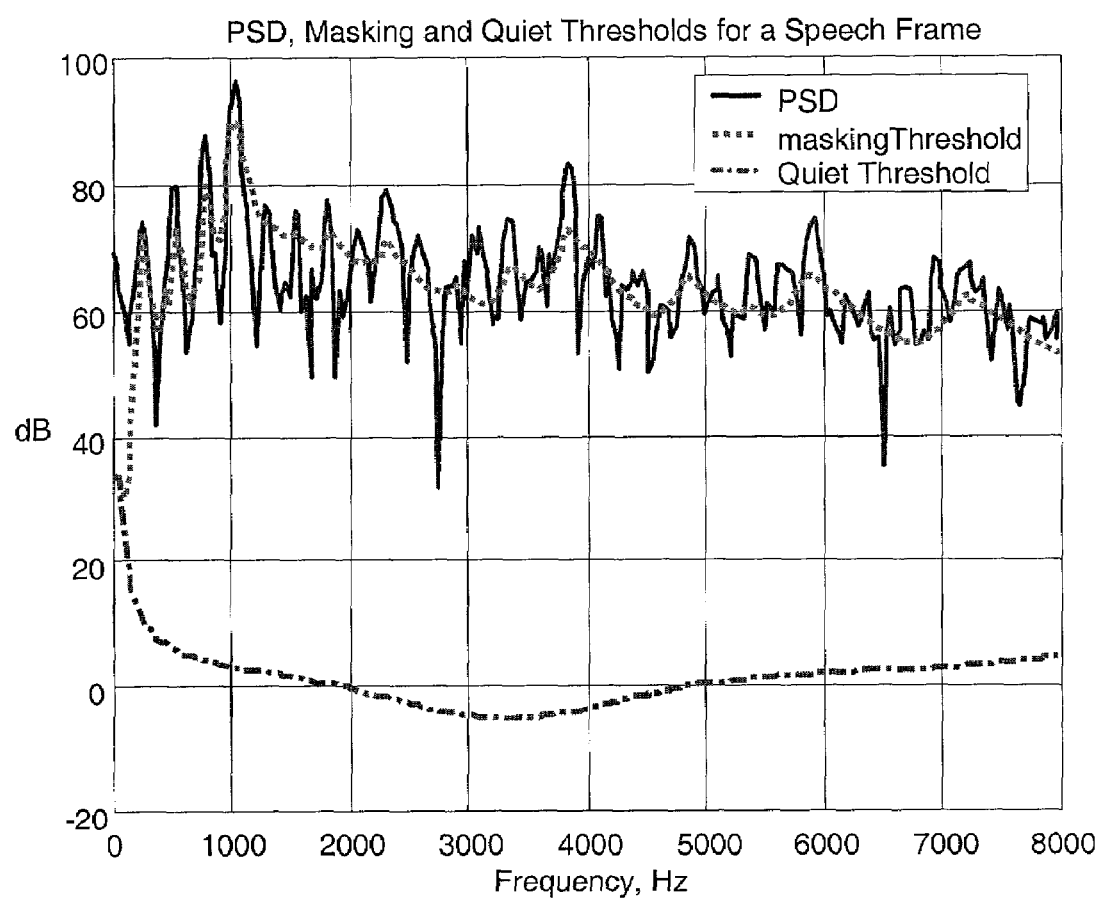
FIG. 3 is a plot of the normalized power spectral density of a frame of speech.

As an example, FIG. 3 shows the normalized power spectral density (PSD), absolute quiet threshold, and threshold of hearing for a frame of speech. The lowest spectral component around 2800 Hz in this figure, for instance, indicates that this component, being below the masking threshold level at that frequency, cannot be perceived in hearing. We notice that with the threshold at approximately 65 dB and the PSD at 32 dB, raising the PSD of the signal at 2800 Hz by as much as 30 dB will still render the component inaudible. Many other such 'psychoacoustical perceptual holes' can be detected in several frequency ranges. The PSD values at these holes can be modified by information to be embedded without affecting the message quality of the frame. This is the basis used in the present work for embedding data in audio. Experiments have been conducted to demonstrate the capability of embedding imperceptible tones to represent concealed data.

Thresholds are obtained based on the example given below. At a sampling rate of 16 kHz with 16 bits per sample, frames of 512 samples are segmented using a Hanning (raised cosine) window. Power spectral density, normalized to 96 dB, was obtained using a 512-point Discrete Fourier Transform (DFT). Power normalization enables the use of the same masker spreading function at each frequency. Absolute quiet threshold, based on young listeners with acute hearing are given by $$T_Q(f) = 3.64\left(\frac{f}{1000}\right)^{-0.8} - 6.5e^{-0.6\left(\frac{f}{1000}-3.3\right)^2} + 10^{-3}\left(\frac{f}{1000}\right)^4 \quad (1)$$

where f denotes frequency in Hz, is calculated. Following the procedure given in [19, 20], frequency maskers based on tones and wideband noise in each critical band, and the global masking threshold $T_G(k)$ at each frequency index k are calculated for each frame. From these values, perceptual holes or frequency indices {k} such that $$T_Q(k) < P(k) < T_G(k) - 5 \quad (2)$$

were determined. If there are at least 10 frequency indices at which the PSD of a frame is down by at least 5 dB from the corresponding masking threshold values, but above the quiet threshold, that frame is considered suitable for data embedding. Because of the relatively high quiet threshold levels at low and high frequencies (below 100 Hz and above 7000 Hz) only, the holes in the range of 100–6000 Hz are used. (Avoiding high frequency range for spectral modification also retains the embedded data when speech is low-pass filtered or otherwise reduced in bandwidth for compression or coding.)

A "covert" signal is input 160, then digitized 170 and used to modify the amplitude 150 of the PSD. The PSD values {P(k)} of a frame with 10 or more perceptual holes are modified 150 to {P'(k)} by the data bits {b(k), k=1, ... 10} as follows.

$$P'(k) \approx \begin{cases} 0.3T_G(k), & \text{if } b(k) = 0 \\ 0.7T_G(k), & \text{if } b(k) = 1 \end{cases} \quad (3)$$

(The approximation above results from the normalization of PSD to a fixed value of 96 dB, which causes a different power scale factor, added to each frame.) If it is determined 155 that a frame has more than 10 locations satisfying Eq. (2), the PSD values at locations above the first 10 are set to the minimum of the global threshold value for that frame

165. This reduces the possibility of channel noise, for example, raising the PSD values at the receiver to values comparable to those at the data-embedded locations.

After making the modified PSD values of the discrete Fourier transform of the frame symmetrical, the frequency spectrum of the data-embedded frame is inverted 180 to obtain the time domain samples for the modified frame. The samples are then quantized 190 for transmission.

At the receiver, the quantized bit for each frame are received 200 and processed to obtain the masking threshold and the PSD 210. Allowing for changes in the PSD, due to quantization, the embedded data {d(k), k=1 . . . 10} are recovered 220 as $$d(k) = \begin{cases} 0, & 0.2T_g(n) < P_r(n) < 0.4T_g(n) \\ 1, & 0.6T_g(n) < P_r(n) < 0.8T_g(n) \end{cases} \quad (4)$$

where {n} are the frequency indices at which $P_r$, the received signal PSD values are above the quiet threshold but below the masking threshold by at least 5 dB.

Frame Phase Modification

Referring to FIG. 2 modification of the phase of the covert data is described. This technique is based on the observation that, in general, the phase spectrum can be altered at perceptually masked spectral points. While this change in phase modifies the waveform, perceptual quality of speech is not affected, particularly if the phase change occurs in a midband of frequencies. A cover or "host" signal is input 230 and the perceptually masked DFT points are calculated 240. The covert signal is input 260, then digitized 270 in using any standard method of audio compression, as employed in the technique represented in FIG. 1. The phase is then modified 250. Based on the previous art reported, encoding of data bits can be accomplished by altering the phase of every fourth point (after 2 kHz) in a 2048-point DFT by ±(π/8) radian relative to a reference point phase [9]. With this differential phase change, successful encoding and decoding for storage media requiring simple synchronization is possible. Instead of differential phase change, the present invention alters the absolute phase at masked spectral points. This ensures that changes in time samples are rendered inaudible. Also, with absolute phase change of ±φ, no synchronization is needed at the receiver. At other masked locations the magnitude and phase are left unchanged. The phase is modified 250 as follows:

$$\varphi'(k) \approx \begin{cases} +\theta, & \text{if } b(k) = 0 \\ -\theta, & \text{if } b(k) = 1 \end{cases}, \quad (5)$$

at {k} such that $T_Q(k) < P(k) < T_G(k) - 5$

After making the modified phase values of cover signal, the data-embedded frame is inverted in 280 to obtain the time domain samples for the modified frame. The samples are then quantized 290 for transmission.

At the receiver, the quantized bits for each frame are received and processed 300 to obtain the masking threshold and to recover the phase 310. Allowing for changes in the phase, due to quantization, the embedded data {d(k), k=1 . . . 10} are recovered 320 as follows:

$$d(k) = \begin{cases} 0, & \theta > 0 \\ 1, & \theta < 0 \end{cases} \quad (6)$$

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. A method for embedding data in audio signals by altering the amplitude of a host signal audio power spectrum, comprising the steps of:
   inputting a host signal;
   calculating the discrete fourier transform points for the masking threshold level;
   computing the masker frequencies and their power levels on a frame-to-frame basis;
   determining a global threshold of hearing at each said masker frequency on a frame-to-frame basis;
   obtaining the sound pressure level for quiet, below which a signal is inaudible;
   inputting a covert signal;
   digitizing said covert signal;
   modifying the amplitude of said power spectrum of said host signal by
   embedding therein said digitized said covert signal on a frame-by-frame basis;
   inverting the frequency spectrum of said amplitude-modified said power spectrum;
   obtaining time domain samples for said inverted frequency spectrum;
   quantizing said time domain samples;
   transmitting said time domain samples;
   receiving at a receiver each quantized bit of each said frame of said time domain-sampled said inverted frequency spectrum;
   processing said each quantized bit to obtain said masking threshold; and
   recovering data from said embedded said covert signal; wherein said step of determining a global threshold of hearing further comprises the step of computing $$T_Q(f) = 3.64\left(\frac{f}{1000}\right)^{-0.8} - 6.5e^{-0.6\left(\frac{f}{1000}-33\right)^2} + 10^{-3}\left(\frac{f}{1000}\right)^4$$

at each said masker frequency.

2. Method of claim 1, wherein said step of modifying the amplitude of said power spectrum further comprises modifying said discrete fourier transform points of said power spectrum P(k) to P'(k) by the rule:

$$P'(k) \approx \begin{cases} 0.3T_G(k), & \text{if } b(k) = 0 \\ 0.7T_G(k), & \text{if } b(k) = 1 \end{cases}.$$

3. Method of claim 1, wherein said step of recovering data further comprises the step de-embedding said data by the rule:

$$d(k) = \begin{cases} 0, & 0.2T_g(n) < P_r(n) < 0.4T_g(n) \\ 1, & 0.6T_g(n) < P_r(n) < 0.8T_g(n) \end{cases}.$$

4. A method for embedding data in audio signals by altering the phase spectrum of a host signal, comprising the steps of:
inputting a host signal;
calculating the perceptually masked discrete fourier transform points;
inputting a covert signal;
digitizing said covert signal;
modifying the phase of said phase spectrum by embedding therein said digitized said covert signal on a frame-by-frame basis;
inverting said phase-modified said phase spectrum;
obtaining time domain samples for said inverted said phase-modified spectrum;
quantizing said time domain samples;
transmitting said time domain samples;
receiving at a receiver each quantized bit of each said frame of said time domain-sampled said inverted phase spectrum;
processing said each quantized bit to obtain said masking threshold and to recover said phase; and
recovering data from said embedded said covert signal;
wherein said step of modifying the phase of said phase spectrum further comprises modifying said discrete Fourier transform points of said phase spectrum φ(k) to φ'(k) by the rule $$\varphi'(k) \approx \begin{cases} +\theta, & \text{if } b(k) = 0 \\ -\theta, & \text{if } b(k) = 1 \end{cases},$$

at {k} such that $T_q(k) < (k) < T_G(k) - 5$.

5. Method of claim 4, wherein said step of recovering data further comprises the step de-embedding said data by the rule:

$$d(k) = \begin{cases} 0, & \theta > 0 \\ 1, & \theta < 0 \end{cases}.$$

* * * * *